DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1364

T889,011

SULFUR DIOXIDE RECOVERY FROM STACK GASES

Archie V. Slack, Wilson Lake Shores, Sheffield, Ala. 35660, and John M. Potts, 1010 Linwood Ave., Florence, Ala. 35630

Filed Aug. 28, 1970, Ser. No. 67,860
**Int. Cl. B01d *53/34***
U.S. Cl. 23—25Q
1 Sheet Drawing. 16 Pages Specification

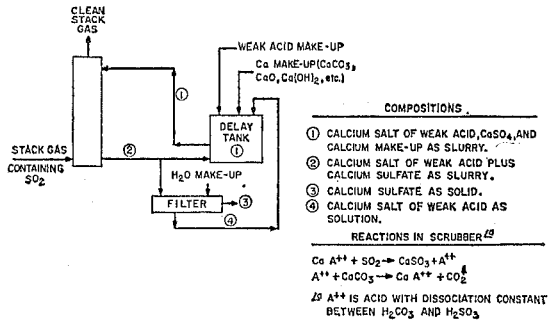

USE OF WEAK ACIDS TO IMPROVE LIME SLURRY SCRUBBING CLOSED-LOOP OPERATION

An improved process for utilizing limestone slurry to scrub sulfur oxides from power plant stack gas which consists of adding a weak acid to a water slurry of limestone, being circulated in a stack gas scrubber, to solubilize the limestone and hasten its reaction with sulfur dioxide; separating the solid reaction product consisting of calcium sulfite and sulfate; washing the reaction product to recover weak acid and using the separated liquor and wash liquor along with fresh limestone as makeup slurry to be fed to the stack gas scrubber. The weak acid should be stronger than carbonic so that it will react with calcium in limestone to solubilize it and displace carbon dioxide, and it should be weaker than sulfurous so that it will be displaced and reconstituted by sulfurous acid formed by dissolution of sulfur dioxide from stack gas; benzoic acid meets the qualifications and is highly satisfactory.

SULFUR DIOXIDE RECOVERY FROM STACK GASES
Filed Aug. 28, 1970
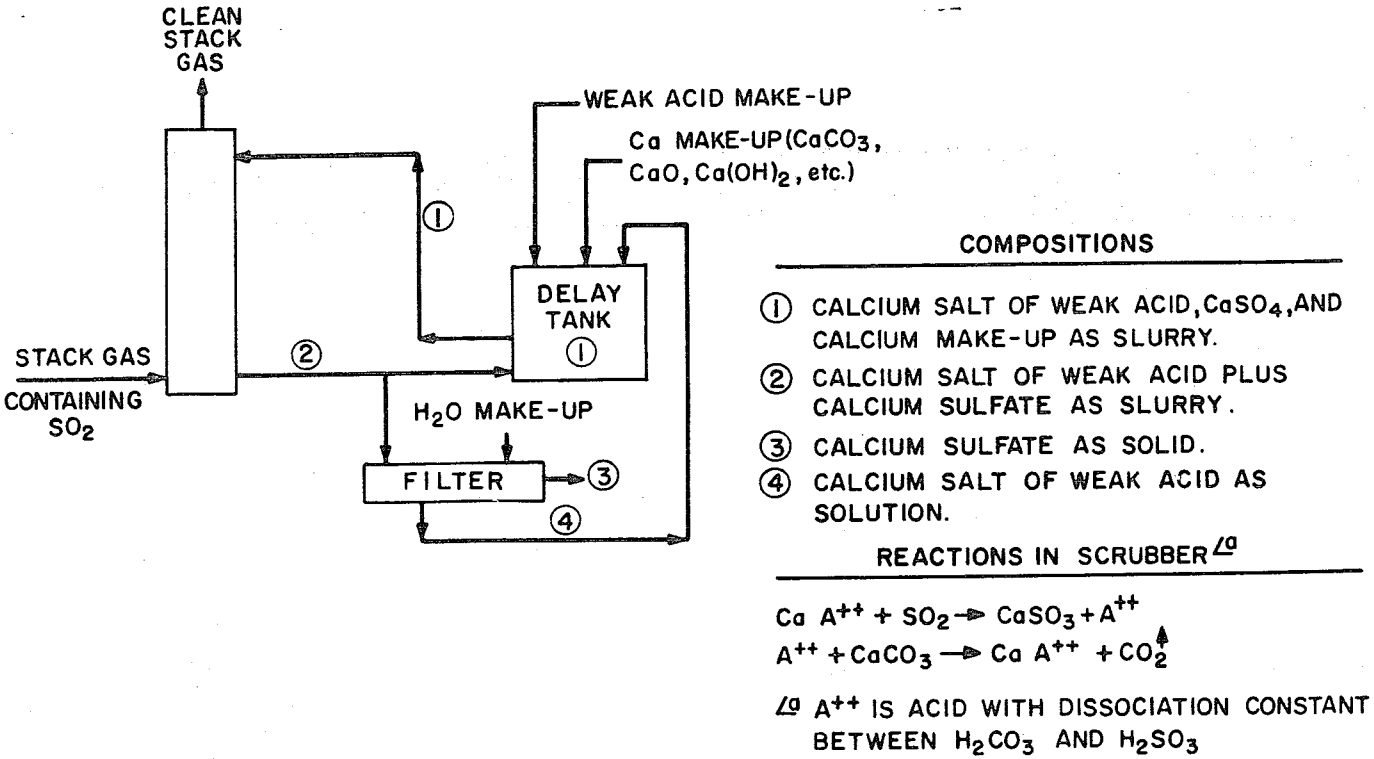
USE OF WEAK ACIDS TO IMPROVE LIME SLURRY SCRUBBING CLOSED-LOOP OPERATION
Archie V. Slack
John M. Potts INVENTORS.
BY Robert A. Petrunka
Agt